United States Patent
Spear et al.

[19]

[11] Patent Number: 5,876,049
[45] Date of Patent: Mar. 2, 1999

[54] PORTABLE STACKABLE WAGON ASSEMBLY

[75] Inventors: Kenneth J. Spear, Vienna; Rudy F. Planthaber, Mineral Wells, both of W. Va.; Steven F. Brooker, Marietta, Ohio

[73] Assignee: O. Ames Co., Parkersburg, W. Va.

[21] Appl. No.: 23,080

[22] Filed: Feb. 13, 1998

Related U.S. Application Data

[60] Provisional application No. 60/054,394 filed Jul. 31, 1997.

[51] Int. Cl.$^6$ .................................................. B62B 3/02
[52] U.S. Cl. ........................... 280/47.371; 280/33.998; 280/87.01; 280/47.315; 280/655.1
[58] Field of Search ................. 280/33.991, 33.998, 280/87.01, 87.05, 47.19, 47.26, 47.31, 47.315, 47.34, 47.35, 47.36, 47.371, 79.2, 47.38, 655, 655.1; 297/129, 183.1, 188.1

[56] References Cited

U.S. PATENT DOCUMENTS

| | | | |
|---|---|---|---|
| Re. 27,683 | 6/1973 | Rubin | 280/33.998 |
| D. 330,639 | 11/1992 | Munro et al. | 297/188.1 |
| 1,560,288 | 11/1925 | Murvay | 280/30 |
| 1,976,170 | 10/1934 | Hoover et al. | 297/183.1 |
| 3,241,853 | 3/1966 | Pasin | 280/87.01 |
| 3,376,046 | 4/1968 | Kivett et al. | 280/33.998 |
| 3,523,694 | 8/1970 | Oliver | 280/33.998 |
| 3,953,047 | 4/1976 | Morgan | 280/639 |
| 4,222,579 | 9/1980 | Frydendal | 280/33.996 |
| 4,373,761 | 2/1983 | Hansberry, Jr. | 280/47.35 |
| 4,460,188 | 7/1984 | Maloof | 280/47.26 |
| 5,085,448 | 2/1992 | Shubin | 280/33.998 |
| 5,163,577 | 11/1992 | Lee | 280/47.26 |
| 5,269,157 | 12/1993 | Ciminelli et al. | 297/188.1 |
| 5,318,315 | 6/1994 | White et al. | 280/47.26 |
| 5,362,272 | 11/1994 | Chow et al. | 280/87.05 |
| 5,390,944 | 2/1995 | Sherwin | 280/47.35 |
| 5,441,289 | 8/1995 | Spielberger | 280/47.371 |
| 5,452,908 | 9/1995 | Bencic | 280/47.19 |
| 5,474,483 | 12/1995 | Sun | 280/33.998 |
| 5,529,323 | 6/1996 | vom Braucke et al. | 280/87.01 |
| 5,538,267 | 7/1996 | Pasin et al. | 280/87.01 |
| 5,538,320 | 7/1996 | Hoffman et al. | 297/188.1 |
| 5,615,903 | 4/1997 | Spear et al. | 280/47.19 |
| 5,645,290 | 7/1997 | Gaffney et al. | 280/33.998 |
| 5,660,296 | 8/1997 | Greenwich | 280/47.26 |
| 5,687,979 | 11/1997 | Plevka | 280/47.19 |
| 5,692,761 | 12/1997 | Havlovitz | 280/33.998 |
| 5,779,252 | 7/1998 | Bolton, Jr. | 280/47.371 |

FOREIGN PATENT DOCUMENTS

| | | | |
|---|---|---|---|
| 296211 | 4/1954 | Switzerland | 280/33.998 |

*Primary Examiner*—Brian L. Johnson
*Assistant Examiner*—Frank Vanaman

[57] ABSTRACT

A wagon assembly for use in gardening and lawn care comprises a wagon body structure constructed and arranged to provide a main compartment. The main compartment is constructed and arranged to accommodate the carriage of items and materials used in gardening and lawn care. A handle structure has a pair of generally opposed surfaces. The handle structure is connected to a front end of the wagon body structure such that the handle structure can be moved between a seating position wherein the handle structure extends rearwardly with respect to the wagon body structure and a range of operating positions wherein the handle structure extends forwardly with respect to the wagon body structure. Wheel structures are rotatably connected to the wagon body structure and constructed and arranged to enable the wagon assembly to be rolled manually by exerting force on the handle structure in the operating positions. The wagon body structure includes upwardly facing handle supporting surfaces constructed and arranged to support the handle structure in the seating position such that the handle structure extends rearwardly with respect to the wagon body structure and one of the pair of generally opposed surfaces faces generally upwardly with respect to the wagon body structure to provide a seating surface constructed and arranged to stably support a person seated thereon when the handle structure is in the seating position, thereby allowing a person to perform gardening and lawn care activities while being seated on the wagon assembly.

55 Claims, 11 Drawing Sheets

PORTABLE STACKABLE WAGON ASSEMBLY

The present application claims the benefit of U.S. Provisional Application Ser. No. 60/054,394 of Spear et al., filed Jul. 31, 1997.

The present invention relates to wagon assemblies, and, more particularly, to wagon assemblies of the stackable type.

Conventionally, a wagon has a rectangular body with four walls configured to carry items and materials therein. A set of wheels rollingly support the conventional wagon. A handle is typically provided so that the wagon can be rolled manually by pulling on the handle. It is also commonly known to rotatably mount the front wheels on an axle which is rotatably mounted to bottom of the wagon body. The handle is then mounted to the axle and the wagon can be steered by pulling the handle in a desired steering direction, thereby rotating the front axle and aligning the front wheels in that direction. The conventional wagon, however, presents a number of problems and shortcomings.

Conventional wagons cannot be stacked on top of one another in a nesting relation. Thus, in order to ship conventional wagons, a manufacturer has two options. First, the manufacturer may ship the conventional wagons fully assembled. However, shipment of fully assembled conventional wagons greatly increases the shipping costs. Second, the conventional wagons may be shipped disassembled. When the conventional wagons are shipped disassembled, however, either the retailer or the consumer must assemble the individual parts and components of the wagon. By placing the responsibility on the retailer or consumer to assemble the conventional wagon, there is a possibility that individual components or parts may become lost or damaged. Also, shipping the wagons unassembled provides opportunities for individual components to be lost or broken during the shipping process.

It is known, however, that stacking items on top of one another in a nesting relation reduces the amount of space needed to store those items. For example, U.S. patent application Ser. No. 08/724,688 discloses a hose cart assembly which is constructed to be stacked in a nesting relation with other hose cart assemblies. By stacking wagons on top of one another, the wagons can be shipped fully assembled at less cost than if they were shipped individually. Also, shipping the wagons fully assembled obviates the problems associated with having the consumer or the retailer assemble the wagons themselves.

Therefore, it is an object of the present invention to provide a wagon assembly which can be stacked in a nesting relation with other wagon assemblies. The present invention is a wagon assembly for use in gardening and lawn care comprising a wagon body structure constructed and arranged to provide a main compartment. The main compartment is constructed and arranged to accommodate the carriage of items and materials used in gardening and lawn care.

A handle structure is pivotally connected to a forward end of the wagon body structure such that the handle structure can be moved between a stacking position wherein the handle structure extends rearwardly with respect to the wagon body structure and a range of operating positions wherein the handle structure extends forwardly with respect to the wagon body structure. Wheel structures are rotatably connected to the wagon body structure. The wheel structures are constructed and arranged to enable the wagon assembly to be rolled manually by exerting force on the handle structure in the operating positions.

Upwardly facing supporting surfaces are constructed and arranged to support a first similar wagon assembly aligned above the wagon assembly in a stable stacking and nesting relation, with the handle structure of the wagon assembly in the stacking position and disposed between the wagon body structure of the wagon assembly and a wagon body structure of the first similar wagon assembly, such that portions of wheel structures of the first similar wagon assembly are disposed between upper peripheral edges of the wagon body structure. Downwardly facing stacking surfaces are constructed and arranged to engage upwardly facing supporting surfaces of a second similar wagon assembly such that portions of the wheel structures of the wagon assembly are disposed below upper peripheral edges of the second similar wagon assembly when the wagon assembly is aligned above the second similar wagon assembly in a stable stacking and nesting relation.

Conventional wagons also fail to provide an adequate surface on which gardeners can arrange certain items and materials during gardening and lawn care. Typically, a gardener must take the items he or she wishes to use from the wagon and lay them out on the ground. This provides a greater opportunity for the gardener to lose those items placed on the ground and for dirt and other debris to collect on these items.

Accordingly, it is also an object of the present invention to provide a wagon assembly having a working surface which allows a user to arrange items and materials used in gardening and lawn care on the working surface.

The object of providing a wagon with an adequate surface on which items and materials can be arranged is accomplished by providing a wagon assembly for use in gardening and lawn care comprising a wagon body structure constructed and arranged to provide a main compartment. The main compartment is constructed and arranged to accommodate the carriage of items and materials used in gardening and lawn care. A handle structure has a pair of generally opposed surfaces. The handle structure is connected to a front end of the wagon body structure such that the handle structure can be moved between a work station position, wherein the handle structure extends rearwardly with respect to the wagon body structure, and a range of operating positions, wherein the handle structure extends forwardly with respect to the wagon body structure.

Wheel structures are rotatably connected to the wagon body structure and are constructed and arranged to enable the wagon assembly to be rolled manually by exerting force on the handle structure in the operating positions. The wagon body structure includes upwardly facing handle supporting surfaces constructed and arranged to support the handle structure in the work station position such that the handle structure extends rearwardly with respect to the wagon body structure and one of the pair of generally opposed surfaces faces generally upwardly with respect to the wagon body structure. The upwardly facing surface provides a work station surface which is constructed and arranged to support items used in gardening and lawn care when the handle structure is in the work station position, thereby facilitating gardening and lawn care activities by allowing a user of the wagon assembly to arrange certain items and materials used in gardening and lawn care on the work station surface.

When performing lawn care and gardening activities, oftentimes it is desirable to be seated. Being seated reduces the need for repeated bending down to the ground to perform such activities as digging and weeding, thereby reducing the likelihood of causing back and knee injury as a result of such bending. Conventional wagon assemblies, however, do not provide any structure on which a gardener can comfortably be seated. Thus, when using conventional wagon assemblies, the user must transport his own seat, such a stool or chair, to the desired location or simply sit on the ground. Therefore, there exists a need for a wagon assembly on which a user can be comfortably seated.

It is accordingly an object of the present invention to meet the above-described need. The present invention is a wagon assembly for use in gardening and lawn care comprising a wagon body structure constructed and arranged to provide a main compartment. The main compartment is constructed and arranged to accommodate the carriage of items and materials used in gardening and lawn care. A handle structure has a pair of generally opposed surfaces. The handle structure is connected to a front end of the wagon body structure such that the handle structure can be moved between a seating position wherein the handle structure extends rearwardly with respect to the wagon body structure and a range of operating positions wherein the handle structure extends forwardly with respect to the wagon body structure. Wheel structures are rotatably connected to the wagon body structure and constructed and arranged to enable the wagon assembly to be rolled manually by exerting force on the handle structure in the operating positions.

The wagon body structure includes upwardly facing handle supporting surfaces constructed and arranged to support the handle structure in the seating position such that the handle structure extends rearwardly with respect to the wagon body structure and one of the pair of generally opposed surfaces faces generally upwardly with respect to the wagon body structure to provide a seating surface constructed and arranged to stably support a person seated thereon when the handle structure is in the seating position, thereby allowing a person to perform gardening and lawn care activities while being seated on the wagon assembly.

There is also a lack of conventional wagons which provide extra storage in addition to the storage provided by the wagon body itself. In the conventional wagon, all the items and materials must be carried in one main compartment. In certain situations, it is not desirable to carry certain items and materials together in the same compartment. A wagon having such additional storage compartments allows certain items and materials using gardening and lawn care to be carried separately from the items and materials carried in the main compartment and allows access to those items and material carried therein.

Accordingly, it is an object of the present invention to provide a wagon assembly having storage compartments in addition to a main compartment. This object is accomplished by providing a wagon assembly for use in gardening and lawn care comprising a wagon body structure constructed and arranged to provide a main compartment. The main compartment is constructed and arranged to accommodate the carriage of items and materials used in gardening and lawn care. Wheel structures are rotatably connected to the wagon body structure. The wheel structures are constructed and arranged to rollingly support the wagon assembly.

A handle structure is constructed and arranged such that the wagon assembly can be rolled manually by exerting force on the handle structure. The wagon body structure is constructed and arranged to provide one or more storage compartments. The one or more storage compartments are constructed and arranged to accommodate the carriage of items and materials used in gardening and lawn care, thereby allowing certain items and materials to be carried separately from the items and materials carried in the main compartment and allowing access to those certain items and materials.

Typically, in the conventional wagon the handle is allowed to fall to the ground when the user releases it. In order to grasp the handle and pull the wagon, the user must bend down to the ground and grab the handle. When using a wagon over a long period of time, it may be necessary to repeatedly bend down to the ground and grab the handle to move the wagon. This repeated bending tends to cause back pain in certain individuals. Also, some individuals may have certain physical problems, such as a knee injury, for example, which makes such repeated bending uncomfortable.

Therefore, it is an object of the present invention to provide a wagon assembly which obviates the need for the user to reach to the ground in order to grasp the handle of the wagon. This object is achieved by providing a wagon assembly for use in gardening and lawn care comprising a wagon body structure constructed and arranged to provide a main compartment. The main compartment is constructed and arranged to accommodate the carriage of items and materials used in gardening and lawn care. Wheel structures are rotatably connected to the wagon body structure. The wheel structures are constructed and arranged rollingly support the wagon assembly. The handle structure is constructed and arranged such that the wagon assembly can be rolled manually by exerting force on the handle structure.

A stopping element is constructed and arranged to yieldingly support the handle structure such that (1) the stopping element maintains the handle structure at a stopped position extending forwardly with respect to the wagon body structure and spaced in relation to a ground surface on which the wagon assembly is disposed, thereby facilitating grasping of the handle structure by allowing a user of the assembly to grasp the handle structure without reaching down to the ground surface, and (2) the handle structure can be pivoted downwardly past the stopped position by exerting force in a downward direction on the handle structure sufficient to cause the stopping element to yield and allow the handle structure to move downward.

In the conventional wagon, items and materials carried in the wagon body are removed by reaching into the wagon body and lifting the items and materials therefrom. This arrangement requires a user of the conventional wagon to bend over and lift those items and materials. The causes the user to expend unnecessary effort and, in cases where the items and materials carried in the main compartment are heavy, expose himself to injury.

It is therefore an object of the present invention to provide a wagon assembly which obviates these problems by providing an easier way to remove items and materials stored in a main compartment of a wagon body. This object is accomplished by providing a wagon assembly for use in gardening and lawn care comprising a wagon body structure constructed and arranged to provide a main compartment. The main compartment is constructed and arranged to accommodate the carriage of items and materials used in gardening and lawn care. Wheel structures are rotatably connected to the wagon body structure. The wheel structures are constructed and arranged to rollingly support the wagon assembly.

A handle structure is constructed and arranged such that the wagon assembly can be rolled manually by exerting force on the handle structure. The wagon body structure includes an opening constructed and arranged to permit items and materials used in gardening and lawn care carried in the main compartment to be removed therefrom through the opening. The wagon body structure includes a panel member constructed and arranged such that the panel member can be retained in the opening in an engaged relation, thereby preventing the items and materials carried in the main compartment from passing through the opening, and the panel member can be moved from the opening to permit items used in gardening and lawn care carried in the main compartment to be removed through the opening.

DETAILED DESCRIPTION OF THE PREFERRED EMBODIMENT

Figure 1:
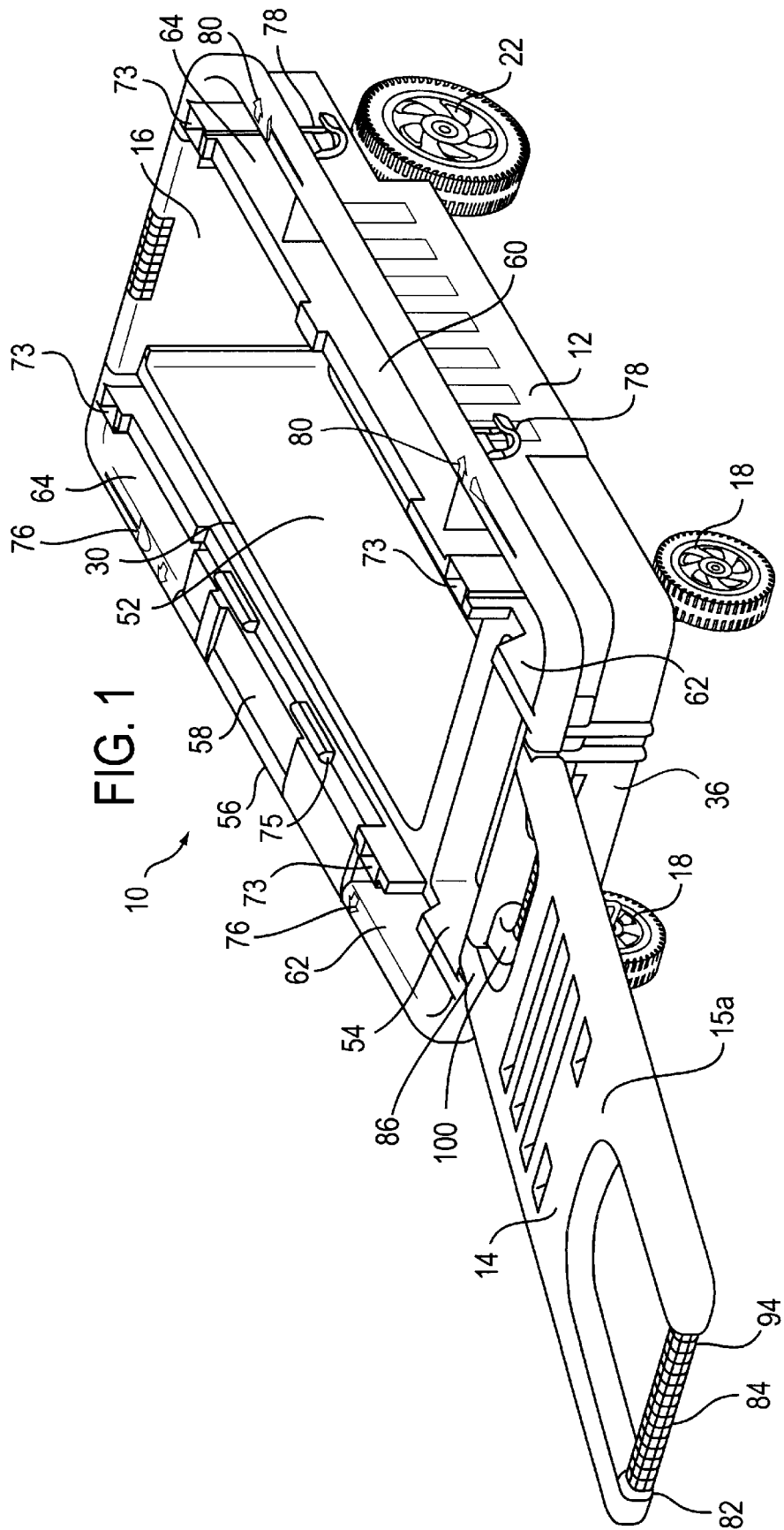
FIG. 1 is a right front perspective view of a wagon assembly embodying the principles of the present invention showing the assembly prepared for transport with the handle structure in an operating position.

Referring more particularly to the drawings, a wagon assembly embodying the principles of the present invention, generally designated 10, is shown in FIGS. 1–11 and generally includes a wagon body structure, generally designated 12, and a handle structure, generally indicated by reference numeral 14. The body structure 12 of the wagon assembly 10 is constructed and arranged to be stacked on top of an identical or similar wagon assembly body structure. The body structure 12 of the wagon assembly 10 is also constructed and arranged to receive a second wagon assembly stacked on top thereof so that a plurality of similar wagon assemblies 10 can be easily stacked. Referring to FIG. 1, it is seen that the major components of the wagon assembly 10 are the wagon body structure 12, the handle member or structure 14, a removable panel member 16, a pair of rotatable front wheel structures 18, in the form of caster wheel assemblies, and a pair of rotatable rear wheel structures 22.

Figure 2:
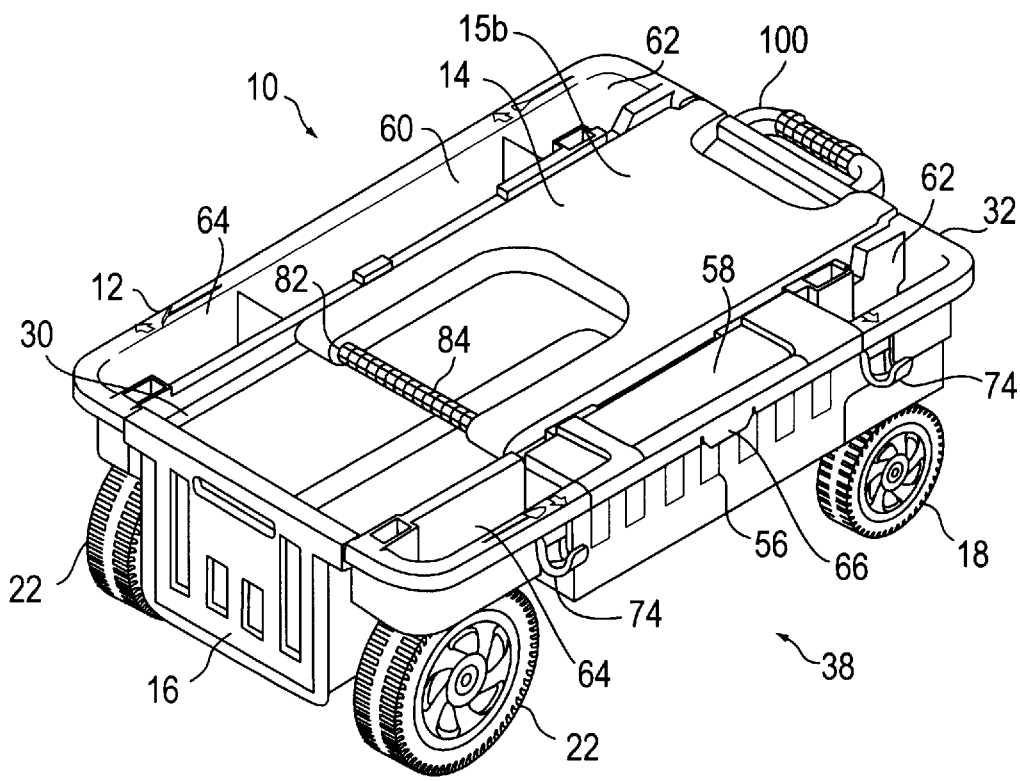
FIG. 2 is a left rear perspective view of the wagon assembly showing the handle structure in a seating or stacking position.

Referring to FIG. 2, the handle member 14 has a pair of generally opposed surfaces 15a, 15b and is pivotally connected to the wagon body structure 12 for pivotal movement about a transverse horizontal axis at the forward end of the wagon body structure 12. The handle member 14 can be pivoted from a fold down seat position (also referred to as a stacking or work station position), shown in FIG. 2, through a range of operating positions, to an upright working position, shown in FIG. 3. When the handle member 14 is in the fold-down seat position, shown in FIG. 2, the handle member 14 extends rearwardly with respect to the wagon body structure 12 and is essentially horizontal. In this fold-down seat position, the handle member 14 is supported on a pair of upwardly facing handle supporting surfaces in the form of parallel ledges 30 formed along a partitioned upper portion 32 of the body structure 12.

When in the upright work position, the wagon assembly 10 is positioned in an upright position and is supported on its rear end surface 34. In this position, the handle member 14 is pivoted from the fold-down seat position until it is essentially parallel to the ground, and is supported by a front end surface 36 of the wagon body structure 12. As can be seen clearly from FIG. 3, the handle structure 14 provides an upwardly facing working surface, in the form of surface 15a, which allows a user of the wagon assembly to arrange certain items and materials used in gardening and lawn care thereon.

Each of the front wheel structures 18 is held rotatably on separate independent axles 40, 42. The individual axles 40, 42 operate independently and permit omni-directional or three hundred and sixty degree rotation of each front wheel structure 18 on the plane of contact with the ground surface 38. An upper end of each front axle 40 or 42 is rotatably secured to the partitioned portion 32 of the wagon body structure 12 with a locking cap 50. A washer element 44 mounted on each front axle 40, 42 maintains the proper vertical position and attitude of each axle 40, 42 with respect to the wagon body structure 12. This configuration for attaching the front wheel structures 18 is commonly known as a caster wheel assembly.

Figure 8:
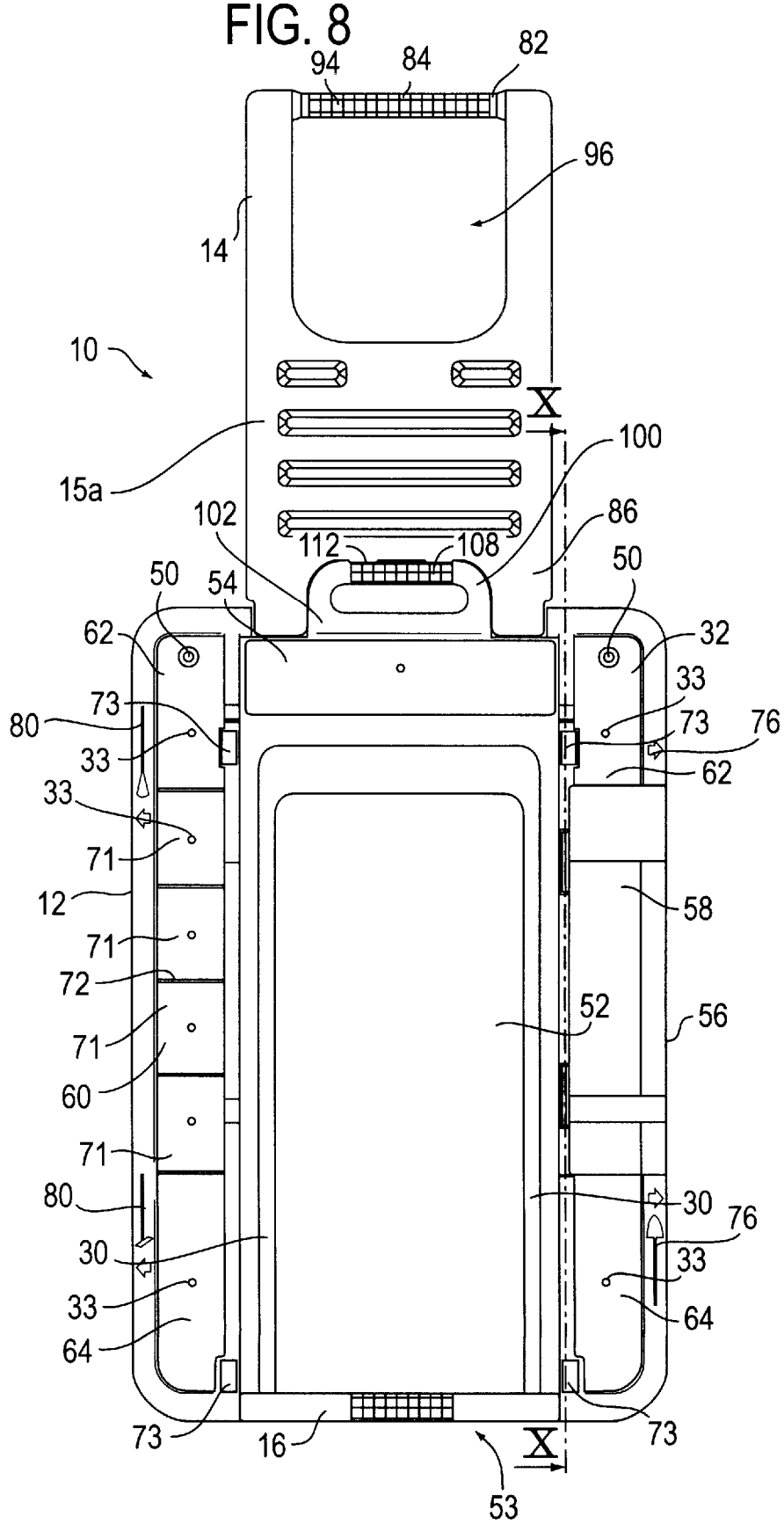
FIG. 8 is a top plan view of the wagon assembly with the handle structure in the operating position.
Figure 9:
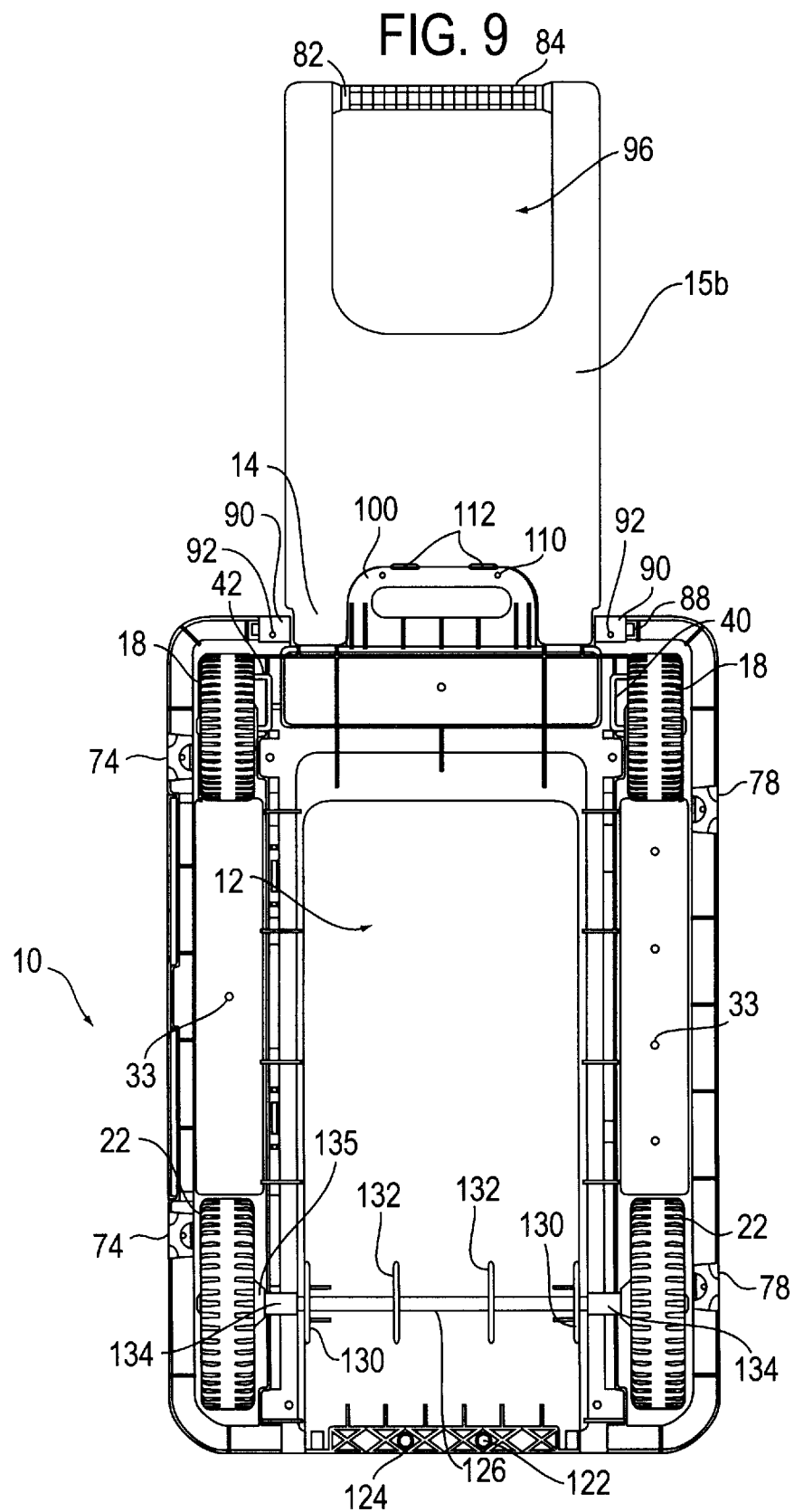
FIG. 9 is a bottom plan view of the wagon assembly with the handle structure in the operating position.

FIG. 2 shows that the partitioned upper portion 32 includes a plurality of essentially rectangular storage compartments of various sizes and depths, a plurality of essentially rectangular trays of various sizes, and a plurality of well structures with open tops. Some wells and compartments are provided with perforations 33 which are best seen in FIGS. 8 and 9 which function as drainage holes therefor. These structures are molded into the partitioned upper portion 32 of the wagon body structure 12. The partitioned upper portion 32 also includes a main compartment or deep central compartment 52 that extends from the removable panel member 16 at a rear end 53 of the wagon body structure 12 to a shallow front tray 54 that extends transversely across a portion of the front end of the wagon body structure 12.

A compartment 56 with a hinged lid or cover element 58 is integrally formed in a central portion of the left side of the partitioned upper portion 32, and a deep partitioned open compartment 60 is formed in a central portion of the right side. An open well 62 is formed at each front corner of the partitioned upper portion 32 of the wagon body structure 12 on either side of the shallow front tray 54. An open well 64 is also located at both rear corners of the partitioned upper portion 32 of the wagon body structure 12 on either side of the deep central compartment 52 that runs longitudinally along the center of the wagon body structure 12.

The pivotable cover element 58 of the storage compartment 56 is held in a closed position by a snap catch 66 at a center front portion thereof. The cover element 58 opens and closes by pivoting about a pair of elongated cylindrical hinge elements 68 each of which is supported on each end thereof by a planar end member 75 integrally molded in a portion of the wagon body structure 12. A pair of opposing arcuate structures 70 integrally molded on an outer surface of a rear portion of each side of the cover element 58 snap onto each hinge element 68 to pivotally secure the cover element 58 thereto. The cover element 58 is easily disengaged from the hinge elements 68 by rotating the cover element 58 rearward about the hinge elements 68 slightly past the point at which the cover element 58 is perpendicular to the horizontal plane of the wagon body structure 12. The outward force on the pair of hinge elements 68 in the cover element 58 causes the hinge elements 68 to snap away from the opposing arcuate structures 70, thereby completely disengaging the cover element 58 from the compartment 56.

The partitioned open compartment 60 in the central portion of the right side of the partitioned upper portion 32 is a deep, rectangular compartment subdivided into four small, longitudinally aligned, open wells 71 by molded-plastic, vertical partition elements 72 rising from the bottom of the partitioned open compartment 60 to a height of less than one-half the depth of the partitioned open compartment 60. The configuration of the partitioned open compartment 60 can accommodate a variety of items of different sizes and shapes, particularly those used in gardening and lawn care.

Two pairs of stake pocket elements 73 at the front and rear, respectively, of the partitioned upper portion 32 provide structure for an optional stake bed in the partitioned upper portion 32 to allow for a larger functional area in the wagon body structure 12.

A pair of tool clip elements 74 are attached to the left side of the wagon body structure 12 to detachably hold tools with larger diameter handles such as rakes, hoes, edgers, etc. for transport or storage. The tool clip elements 74 are constructed in accordance with the teachings of commonly owned U.S. Pat. No. 5,615,903, the disclosure of which is hereby incorporated by reference into the present specification. The tool clip elements 74 accomplish the attaching function by utilizing a snap-in action. Raised emblems 76 are molded into an upwardly facing portion of the left side of the wagon body structure 12 to indicate the position of the clips.

A second pair of tool clip elements 78, similar to the pair of tool clip elements 74, are attached to the right side of the wagon body structure 12 to detachably hold tools with smaller handles for transport or storage. The pair of tool clip elements 78 also accomplish the attaching function by utilizing a snap-in action. Raised emblems 80 are molded into an upwardly facing portion of the right side of the wagon body structure 12 to indicate the position of the clips.

Figure 3:
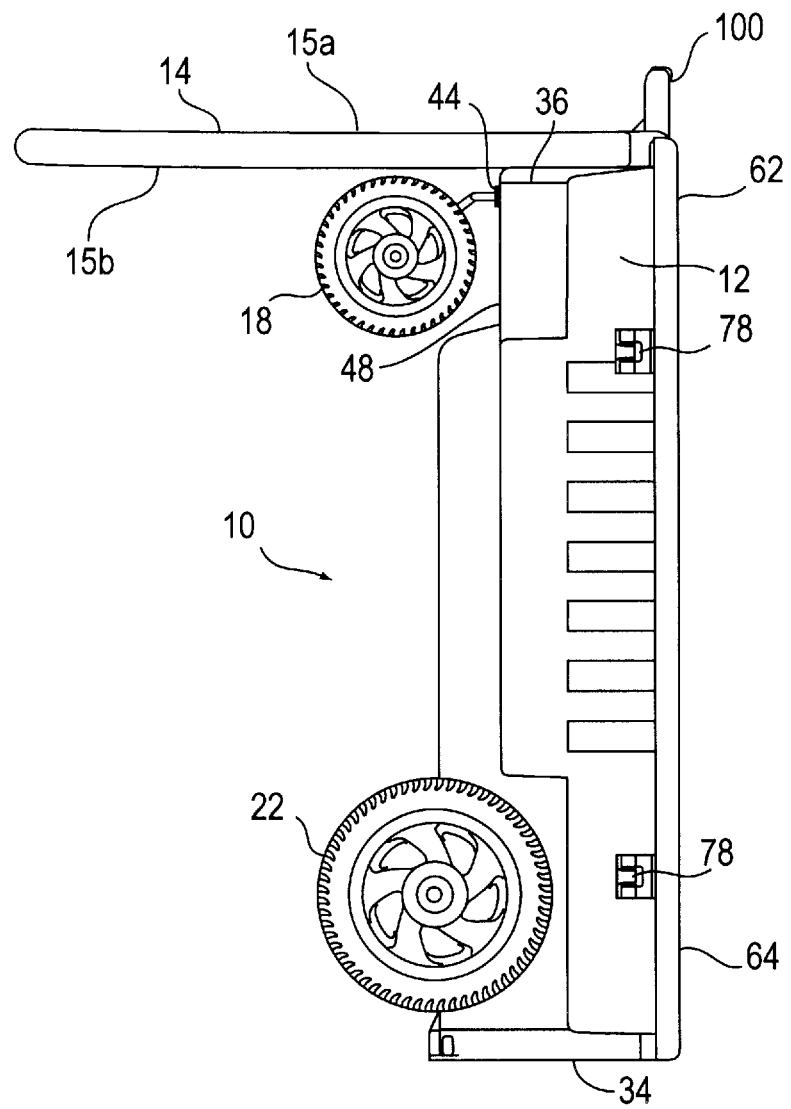
FIG. 3 is a right side elevational view of the wagon assembly showing the wagon assembly in an upright position with the handle structure in a working position.

The handle member 14 is a single molded piece with a transverse element 82 at the top that includes a cylindrical grip portion 84 and a pair of extension elements 86 at the bottom. FIGS. 1, 2 and 3 show that the handle member 14 assumes various positions with respect to the wagon body structure 12 including the fold-down seat position, shown in FIG. 2, and the working position, shown in FIG. 3. As shown in FIG. 9, the handle member 14 is connected to the wagon body structure 12 by a pivot rod 88 which is secured to the body structure 12 with a pair of attaching elements 90 and suitable attaching hardware structures 92. The cylindrical grip 84 has a grooved gripping surface 94 that includes a plurality of equally spaced longitudinally extending grooves running parallel to the transverse element 82 and a plurality of equally spaced arcuate grooves extending circumferentially around the transverse element 82. There are two open areas formed in the handle member 14. An open area 96 is formed at the top of the handle member 14 and an open area 98 is formed at the bottom. The open area 96 at the top of the handle member. 14 allows complete circumferential contact when manually grasping the cylindrical grip 84.

Figure 7:
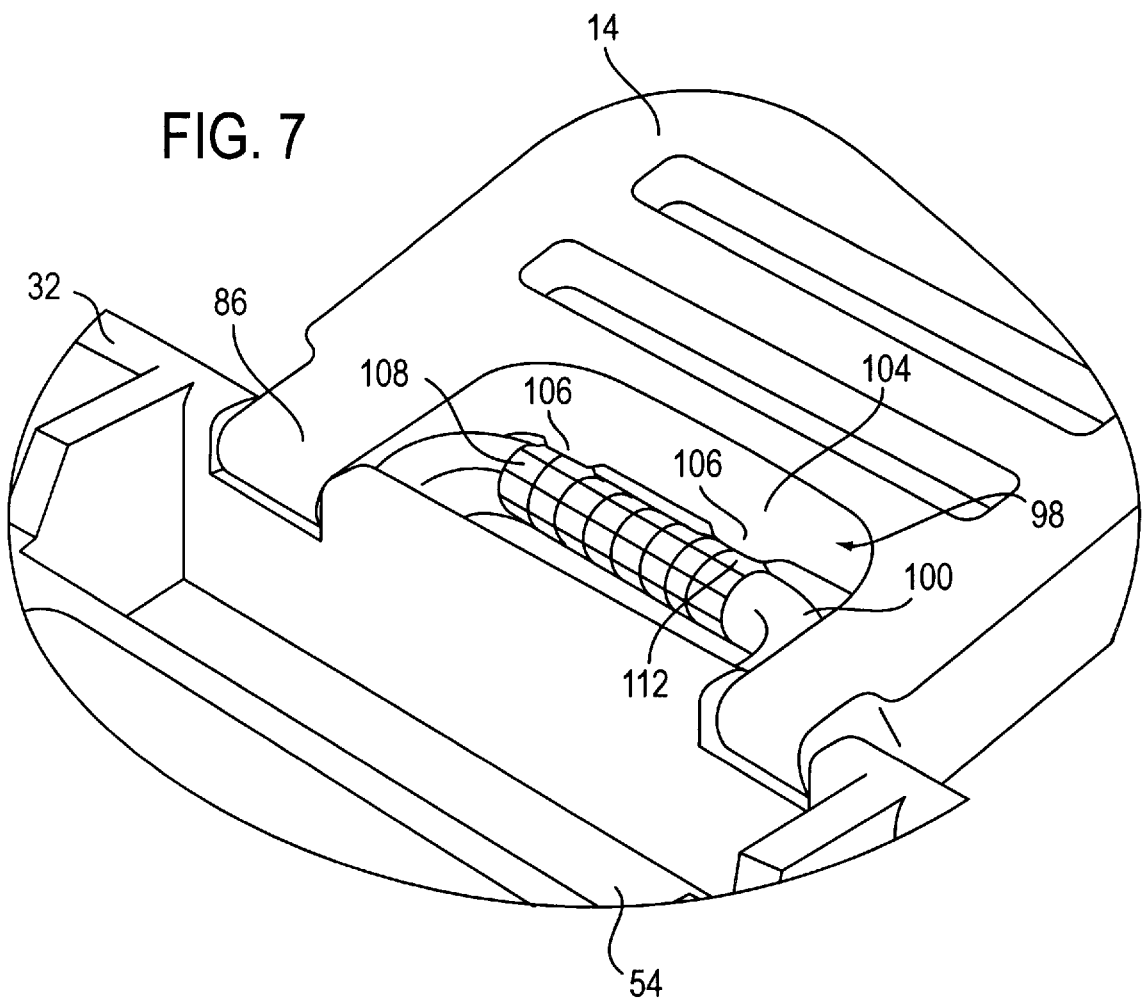
FIG. 7 is a fragmentary perspective view of a front portion of the wagon assembly illustrating a stopping element in the form of a secondary handle structure.

The recessed portion or open area 98 at the bottom of the handle member 14 enables the handle member 14 to rotate past a secondary handle structure or fixed molded body handle element 100 integrally formed on a front end portion 102 of the wagon body structure 12. As best shown in FIG. 7, a plurality of raised surface areas 106 integrally formed along a bottom surface 104 of the handle member 14 extend into the open area 98. The molded body handle element 100 includes a pulling grip 108 that attaches to the body handle element 100 with any suitable type of attaching hardware 110 (see FIG. 9). The pivot rod 88, the two attaching members 90, and the suitable attaching hardware 92 cooperate to rotatably secure the handle member 14 to the wagon body structure 12.

An upper portion of the pulling grip 108 surface is also shaped to include a pair of raised surface areas 112. The pair of raised surface areas 112 on the pulling grip 108 are positioned to make contact with the pair of raised surface areas 106 on the handle member 14 as the handle member 14 pivots about the pivot rod 88. The pair of raised surface areas 106 on the handle member 14 make contact with the pair of raised surface areas 112 on the pulling grip 108 and resists the further rotation of the handle member 14 at one point in the rotation thereof about the pivot rod 88. Thus, the body handle element or secondary handle structure 100 acts as a stopping element which yieldingly supports the handle structure at a stopped position extending forwardly with respect to the wagon body structure 12 and spaced above the ground.

Figure 6:
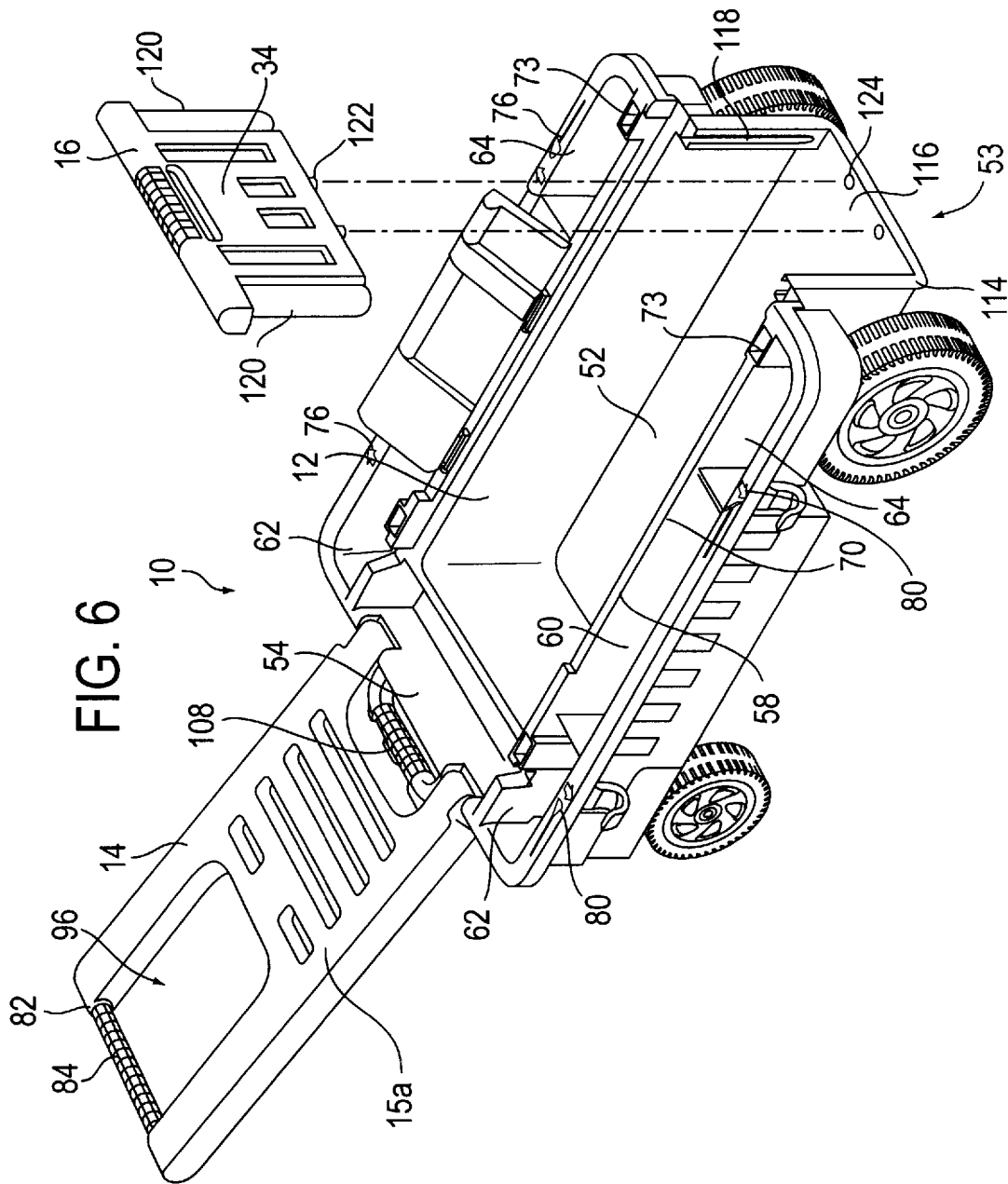
FIG. 6 is a right rear perspective view of the wagon assembly showing an exploded view of a panel member and a lid of a storage compartment in an opened position.

As shown in FIG. 6, the removable panel member 16 at a rear end 114 of the wagon body structure 12 is guided into proper placement in a channeled rear opening 116 in the wagon body structure 12 by a pair of guide tracks 118 molded into the rear end 114 of the wagon body structure 12. The guide tracks 118 on each side of the channeled rear opening 116 each receive an extended guiding element 120 integrally formed on opposite sides of the removable panel member 16 to hold the panel member 16 in place to form a rear wall of the main compartment 52. Two cylindrical position pin elements 122 on the bottom of the panel member 16 seat the panel member 16 in the proper position by engaging with a pair of positioning holes 124 at the bottom of the rear end 114 of the wagon body structure 12. It can be clearly seen from the drawings that removal of the panel member 16 allows one to easily remove items and materials used in gardening and lawn care through the opening 116.

The pair of rotating front wheel structures 18 are made of molded plastic and define a bore which extends partially through the center of each allowing them to be rotatably mounted upon individual axles 40, 42. The pair of rotating front wheel structures 18 are essentially annular molded plastic members, smaller than the pair of rotating rear wheel structures 22, and are preferably molded in a color contrasting to the molded natural colors of the wagon body structure 12 and the handle member 14.

Figure 10:
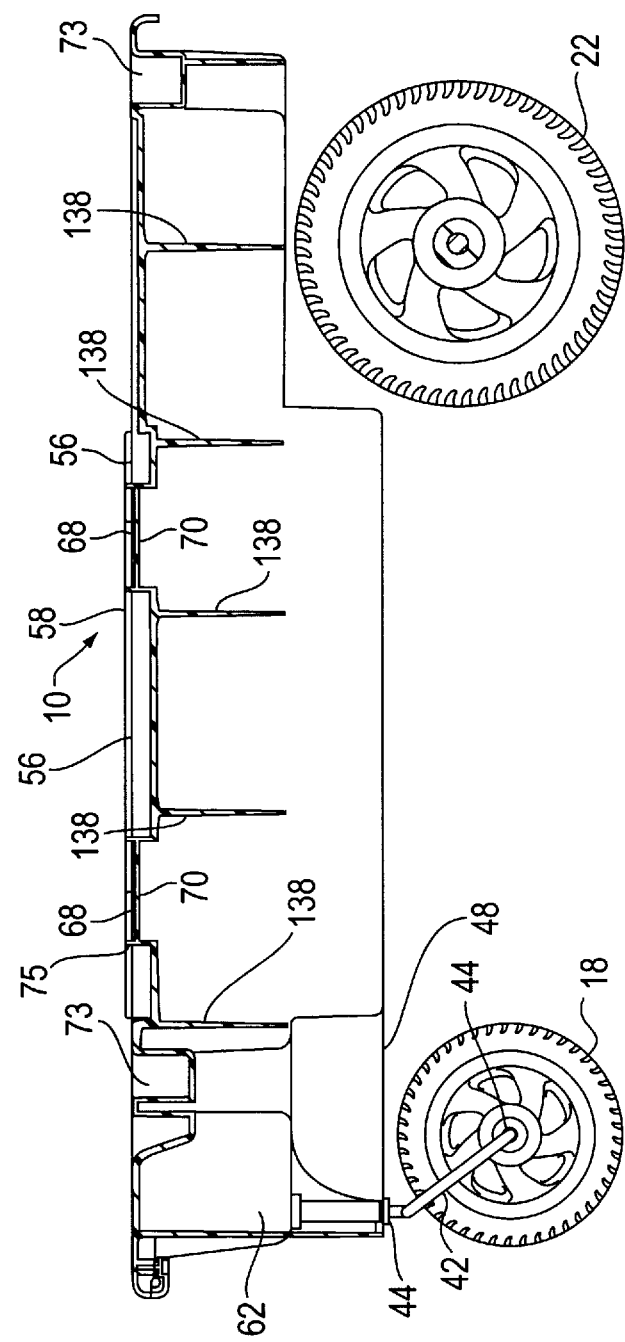
FIG. 10 is a cross-sectional view of the wagon assembly taken along line X—X of FIG. 8.

The pair of rotating rear wheel structures 22 are made of molded plastic and each defines a central bore allowing them to be rotatably mounted upon a shaft 126, beneath the underside surface 48 of the wagon body structure 12. The rotating rear wheel structures 22 are retained on the shaft 126 by a pair of suitable rear end caps 128 (see FIG. 5) that attach to the ends of the shaft 126. The pair of rotating rear wheel structures 22 are also essentially annular molded plastic members and are preferably molded in a color contrasting to the molded natural colors of the wagon body structure 12 and the handle member 14. FIG. 9 shows that the shaft 126 is rotatably held on the underside surface 48 of the body structure 12 by a pair of outer retaining elements 130 and a pair of inner retaining elements 132. Proper positioning of rear wheel structures 22 with respect to the body structure 12 is maintained by a pair of spacer elements 134 each of which is positioned adjacent a protruding inner hub structure 135 on each rear wheel structure 22. The cross-sectional view of FIG. 10 shows details of the stake pocket elements 73 and the structural reinforcing elements 138. These structural reinforcing elements provide strength and stability between the main central compartment 52 and the deep partitioned open compartments 60.

Although the handle member 14 can be rotated approximately 270 degrees from the fold-down seat position, shown in FIG. 2, to the working position, shown in FIG. 3, the handle member 14 functions mainly in three specific operating positions depending upon whether the wagon assembly 10 is being used as a seat, as a wagon or as a work station. When the wagon assembly 10 is being used as a seat or when it is being stored or stacked, the handle member 14 is folded down into the wagon body structure 12 as shown in FIG. 2. When functioning as a seat, the four wheel structures 18 and 22 rollingly engage the ground surface 38 and the user can sit on the central portion of the handle member 14 and use his or her legs to roll the wagon assembly 10 along the ground 38. When the handle 14 is in the fold-down position, the user has access to the compartments and wells in the partitioned upper portion 32. It can also be seen that in this fold-down position, the handle member 14 can also be used as a work station surface which allows a user to arrange items and materials used in gardening and lawn care thereon.

Figure 4:
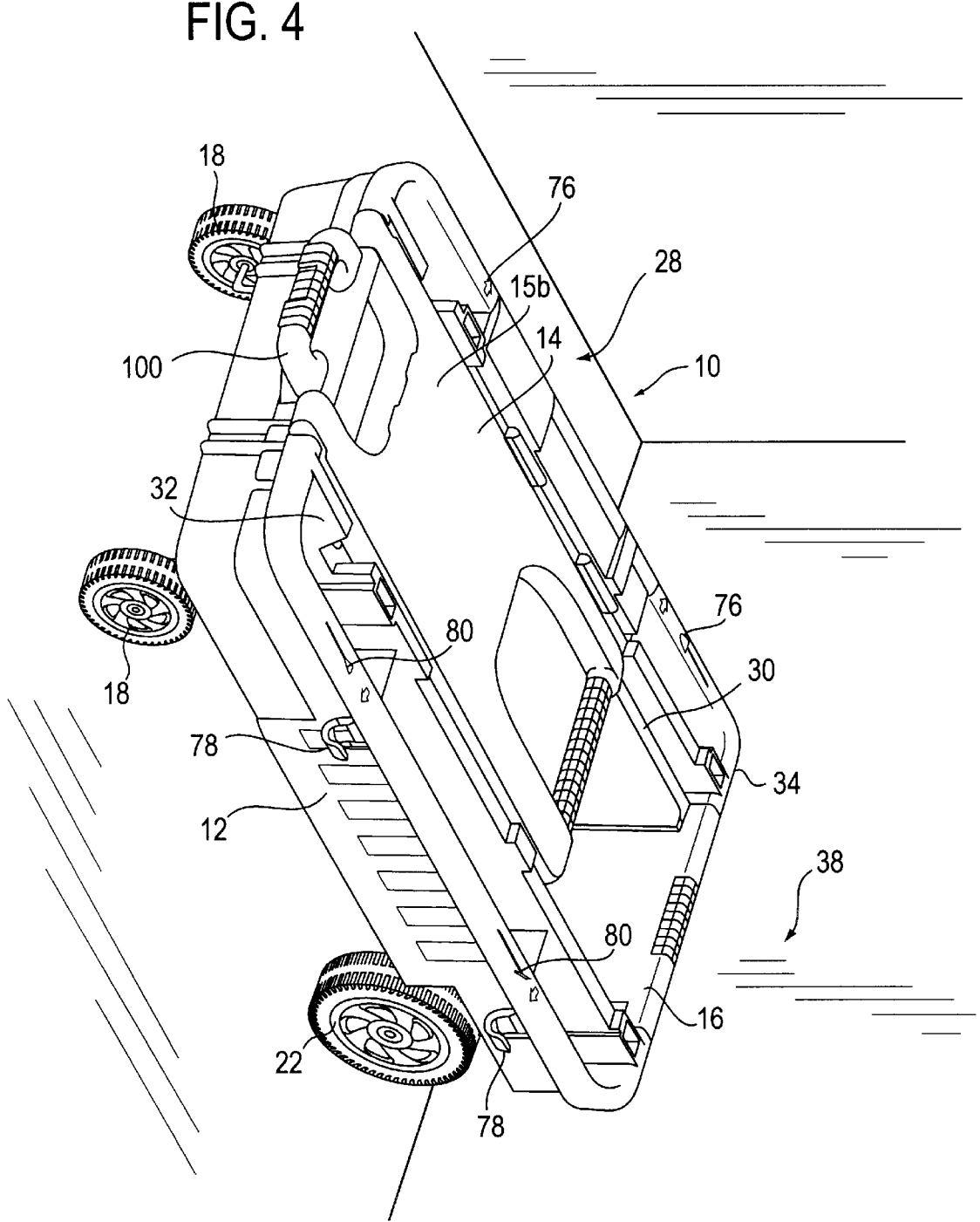
FIG. 4 is a perspective view of the wagon assembly configured for compact storage with a rear surface of the wagon assembly in contact with the ground.
Figure 5:
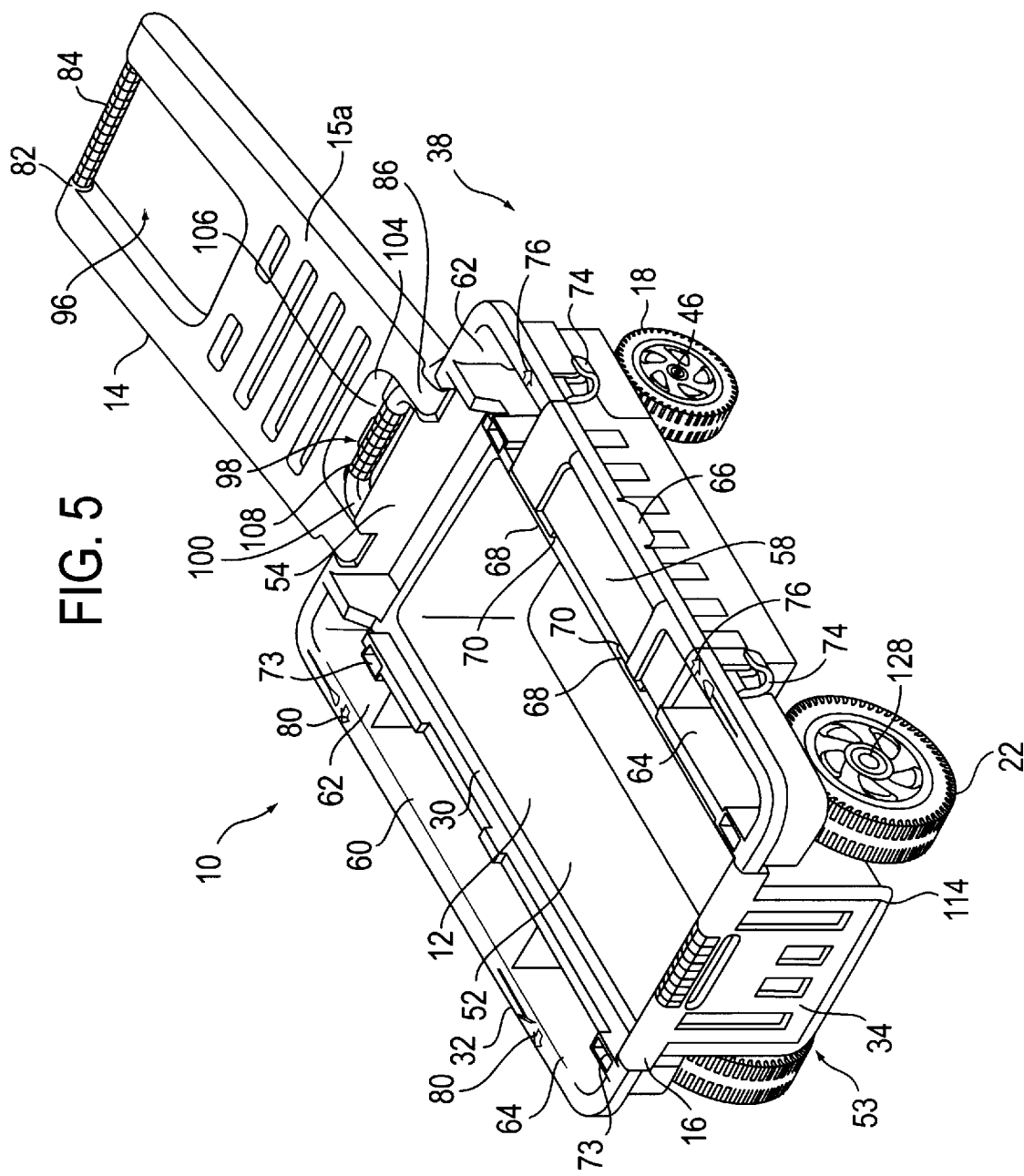
FIG. 5 is a left rear perspective view of the wagon assembly embodying the principles of the present invention, showing the assembly with the handle structure in the operating position.
Figure 11:
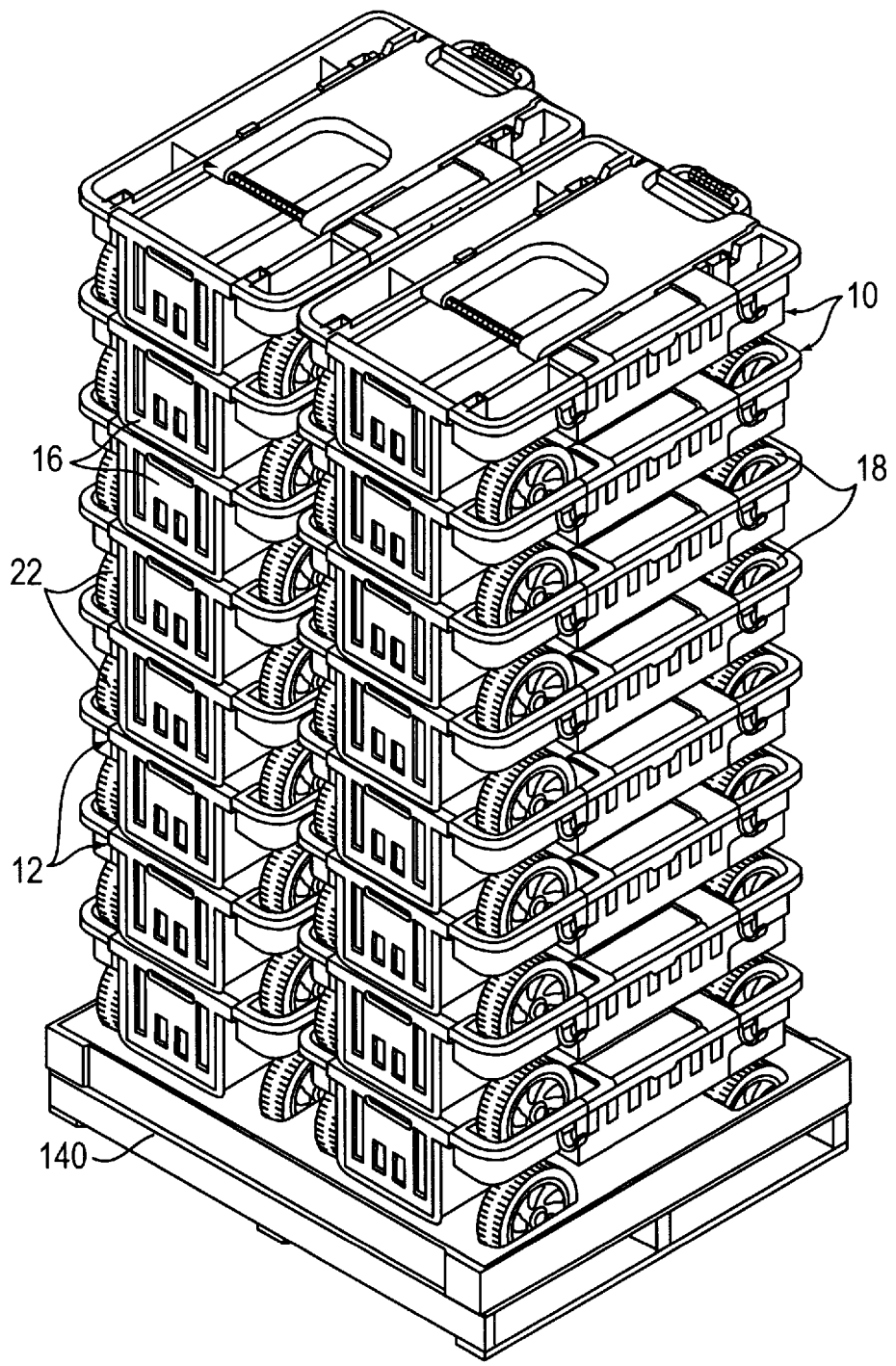
FIG. 11 depicts several wagon assemblies with the handle structures of each in the stacking position stacked upon one another in a nesting relation.

The wagon assembly 10 can also be stacked in a nesting relation with other wagon assemblies when the handle is in the fold-down (or stacking) position, as shown in FIG. 11, or stored in an upright nonrolling position, as shown in FIG. 4. Referring to FIG. 11, multiple wagon assemblies 10 can be stacked in a nested relation on a pallet 140 for shipment from the manufacturer to the seller. This stacked and nested relationship enables the wagon assembly 10 to be sold fully assembled, while enabling storage and inventory aspects for both the manufacture and seller to be manageable and cost effective. The stack can be banded or tied together to facilitate storage and transportation of the wagon assemblies 10 at the manufacturing location as well as the location of sales. To stack the wagon assemblies, the handle member 14 is pivoted down to the fold-down or stacking position to rest on the pair of parallel ledges 30 on the wagon body structure 12. Then, a first wagon assembly 10 is placed on top of a second wagon assembly 10 so that the front wheel structures 18 of the first assembly partially enter the open wells 62 of the second assembly 10, the rear wheel structures 22 of the first assembly partially enter the open wells 64 of the second assembly, and the downwardly facing stacking or underside surface 48 of the first assembly rests upon the upper surface 15*b* of the handle member 14 of the second assembly. The upper surface of the handle structure 14 and upper surfaces of the upper peripheral edges of the wagon body structure 12 and the open wells 62, 64 provide upwardly facing supporting surfaces which support a similar wagon assembly stacked thereon. Also, the bottom surfaces of the wagon body structure 12 and the lowermost portions of the wheel structures 18, 22 define downwardly facing stacking surfaces.

The second operating position of the handle member 14 is shown in FIGS. 5, 6, 7, 8 and 9 and is called the forward extended position, the transport position, or the operating position. When the handle member 14 is disposed in this position, the four wheel structures 18 and 22 are in rolling engagement with the ground or support surface 38 and the grip 84 on the transverse element 82 is elevated higher above the ground 38. In this position, the handle member 14 extends angularly upward from the wagon body structure 12 and forms an acute angle with the ground 38. The handle member 14 is maintained in this angled forward extended position by the contact between the raised surface areas 106 on the handle member 14 and the raised surfaces 112 on the grip 108. The weight of the handle member 14 is insufficient to overcome the contact resistance offered by the raised surfaces 106 and 112 so that the grip 84 is conveniently elevated above the ground for the user to grasp without bending over. In this position, the wagon assembly 10 can be used as a wagon to carry tools, equipment, plants or many other items. The user can push/pull the wagon assembly 10 in any direction because of the omni-directional front wheels 18. The user can also freely lift the handle structure 14 to elevate the grip structure 84 to accommodate tall users because this upward movement rotates the handle structure 14 away from the direction of contact of the surfaces 106 and 112. The wagon assembly can be easily moved or towed using the molded body handle element 100 as well. If sufficient downward force is applied to the handle member 14, the raised surface areas 106 on the handle member 14 and the raised surface areas 112 on the grip 108 can move past one another because both the raised surface areas 106 on the handle member 14 and the raised surface areas 112 on the grip 108 are preferably formed of a resilient deformable elastic material that returns to their original shapes after being depressed. By lowering the handle member 14, it can accommodate children or shorter adults.

The removable panel member 16 can be disposed in an engaged relation with opening 116 formed in the rear end 114 of the wagon body structure 12, or removed therefrom. The removable panel member 16 can be fixed in place during loading and transport operations, and removed to facilitate unloading operations. The main compartment 52 can be easily emptied by manually grasping the secondary handle structure 100 and lifting the wagon assembly 10 so as to dump the contents of the main compartment outwardly through the opening 116.

The rotatable properties of the two independent rotating front wheel structures 18 allow the wagon assembly 10 to be easily and rapidly maneuvered into a position or space that will accommodate the exterior dimensions of the wagon assembly 10 by steering the rotational and linear movement of the assembly in either a forward or rearward direction. The two rotating front wheel structures 18, on freely rotating vertical axles 40, 42, provide a degree of rotational flexibility with respect to the ability to change the direction of forward movement, while the wheels 18, 22 cooperate to form a stable four point base. This four point base 18 and 22, together with a low center of gravity of the wagon assembly 10 and an attractive rectangular, length to width ratio of the wagon body structure 12, provides an added stability during the movement and use of the wagon assembly 10 that helps to prevent tipping of the wagon assembly 10.

The third operating position of the handle is shown in FIG. 3 and is referred to as the working position of the wagon assembly 10. In this configuration the wagon assembly is set upright so the rear end surface 34 is resting on the ground surface 38 and the wheels 18 and 22 are not in contact with the ground 38. The third operation position of the handle 14 is then essentially parallel to the ground because the handle member 14 is rotated about the pivot rod 88 until the handle member 14 contacts and is supported by the front end surface 36 of the wagon body structure. In this configuration, the handle structure 14 provides a convenient working surface on which a user may arrange various items and materials associated with gardening and lawn care.

It will thus be seen that the objects of the present invention have been fully and effectively accomplished. It will be realized, however, that the foregoing preferred specific embodiment has been shown and described for the purpose of illustrating the functional and structural principles of this invention and is subject to change without departure from such principles. Therefore, the present invention includes all modifications encompassed within the spirit and scope of the following claims.

What is claimed is:

1. A wagon assembly for use in gardening and lawn care comprising:
    a wagon body structure constructed and arranged to provide a main compartment, said main compartment being constructed and arranged to accommodate the carriage of items and materials used in gardening and lawn care;
    a handle structure having a pair of generally opposed surfaces, said handle structure being connected to a front end of said wagon body structure such that said handle structure can be moved between a seating position wherein said handle structure extends rearwardly with respect to said wagon body structure and a range of operating positions wherein said handle structure extends forwardly with respect to said wagon body structure; and
    wheel structures rotatably connected to said wagon body structure and constructed and arranged to enable said wagon assembly to be rolled manually by exerting force on said handle structure in said operating positions;
    said wagon body structure including upwardly facing handle supporting surfaces constructed and arranged to support said handle structure in said seating position thereof such that said handle structure extends rearwardly with respect to said wagon body structure and one of said pair of generally opposed surfaces faces generally upwardly with respect to said wagon body structure to provide a seating surface;
    said seating surface being constructed and arranged to stably support a person seated thereon when said handle structure is in said seating position thereof, thereby allowing a person to perform gardening and lawn care activities while being seated on said wagon assembly.

2. A wagon assembly according to claim 1 wherein said upwardly facing handle supporting surfaces are ridges extending longitudinally with respect to said wagon body structure.

3. A wagon assembly according to claim 1 wherein said seating surface is constructed and arranged to support items used in gardening and lawn care when said handle structure is in the seating position thereof, thereby facilitating gardening and lawn care activities by allowing a user of said wagon assembly to arrange certain items and materials used in gardening and lawn care on said seating surface.

4. A wagon assembly according to claim 1 wherein said handle structure has a generally rectangular shape and a gripping portion constructed and arranged to be manually engaged.

5. A wagon assembly according to claim 1 wherein said wagon body structure comprises tool clip elements constructed and arranged to detachably retain tools used in gardening and lawn care.

6. A wagon assembly according to claim 1, wherein said wheel structures comprise two front wheel structures and two back wheel structures each having an annular shape; and
    said front wheel structures are caster wheel assemblies wherein each front wheel structure is rotatably mounted on an individual axle rotatably connected to said wagon body structure such that said wagon assembly can be steered while being rolled manually by exerting force on said handle structure in said operating positions in a desired steering direction, thereby aligning said front wheel structures in said desired steering direction such that said front wheel structures guide said wagon assembly in said desired steering direction.

7. A wagon assembly according to claim 1 further comprising a secondary handle structure fixedly connected to said wagon body structure, said secondary handle structure being constructed and arranged to enable said wagon assembly to be rolled manually by exerting force on said secondary handle structure when said handle structure is in said seating position.

8. A wagon assembly according to claim 1 further comprising:
    upwardly facing supporting surfaces constructed and arranged to support a similar wagon assembly stacked on top of said wagon assembly in a stable stacking relationship; and
    downwardly facing stacking surfaces constructed and arranged to engage upwardly facing supporting surfaces of a similar wagon assembly on top of which said wagon assembly is stacked in a stable stacking relationship.

9. A wagon assembly according to claim 8 wherein said upwardly facing supporting surfaces include upper peripheral edges of said wagon body structure and said downwardly facing stacking surfaces include a downwardly facing surface of said wagon body structure.

10. A wagon assembly according to claim 8 wherein said seating surface is constructed and arranged to support items used in gardening and lawn care when said handle structure is in the seating position thereof, thereby facilitating gardening and lawn care activities by allowing a user of said wagon assembly to arrange certain items and materials used in gardening and lawn care on said seating surface.

11. A wagon assembly according to claim 8 wherein said upwardly facing supporting surfaces include said seating surface.

12. A wagon assembly according to claim 1 wherein said wagon body structure is constructed and arranged to provide one or more storage compartments, said one or more storage compartments being constructed and arranged to accommodate the carriage of items and materials used in gardening and lawn care, thereby allowing certain items and materials used in gardening and lawn care to be carried separately from the items and materials carried in the main compartment and allowing access to those certain items and materials.

13. A wagon assembly according to claim 12 wherein said wagon body structure comprises an opening constructed and arranged to permit items and materials used in gardening and lawn care carried in said main compartment to be removed therefrom through said opening; and a panel member constructed and arranged such that said panel member can be retained in said opening in an engaged relation, thereby preventing the items and materials carried in said main compartment from passing through said opening, and said panel member can be moved from said opening to permit items used in gardening and lawn care carried in said main compartment to be removed therefrom through said opening.

14. A wagon assembly according to claim 13 further comprising a stopping element constructed and arranged to yieldingly support said handle structure such that (1) said stopping element maintains said handle structure at a stopped position extending forwardly with respect to said wagon body structure and spaced in relation to a ground surface on which said wagon assembly is disposed, thereby facilitating grasping of said handle structure by allowing a user of said wagon assembly to grasp said handle structure without reaching down to the ground surface, and (2) said handle structure can be pivoted downwardly past said stopped position by exerting force in a downward direction on said handle structure sufficient to cause said stopping element to yield and allow said handle structure to move downward.

15. A wagon assembly according to claim 12 wherein said wagon body structure comprises tool clip elements constructed and arranged to detachably retain tools used in gardening and lawn care.

16. A wagon assembly according to claim 12 wherein said one or more storage compartments includes a secondary storage compartment constructed and arranged to accommodate the carriage of items and materials used in gardening and lawn care; and a lid member pivotally connected to said secondary storage compartment and movable between an opened position wherein said secondary storage compartment is open, thereby allowing access to said secondary storage compartment, and a closed position wherein said secondary storage compartment is closed.

17. A wagon assembly according to claim 16 wherein said wagon body structure comprises tool clip elements constructed and arranged to detachably retain tools used in gardening and lawn care.

18. A wagon assembly according to claim 12 wherein said seating surface is constructed and arranged to support items used in gardening and lawn care when said handle structure is in the seating position thereof, thereby facilitating gardening and lawn care activities by allowing a user of said wagon assembly to arrange certain items and materials used in gardening and lawn care on said seating surface.

19. A wagon assembly according to claim 12 further comprising:

upwardly facing supporting surfaces constructed and arranged to support a similar wagon assembly stacked on top of said wagon assembly in a stable stacking relationship; and downwardly facing stacking surfaces constructed and arranged to engage upwardly facing supporting surfaces of a similar wagon assembly on top of which said wagon assembly is stacked in a stable stacking relationship.

20. A wagon assembly according to claim 19 wherein said one or more storage compartments includes a secondary storage compartment constructed and arranged to accommodate the carriage of items and materials used in gardening and lawn care; and a lid member pivotally connected to said secondary storage compartment and movable between an opened position wherein said secondary storage compartment is open, thereby allowing access to said secondary storage compartment, and a closed position wherein said secondary storage compartment is closed.

21. A wagon assembly according to claim 20 wherein said wagon body structure comprises tool clip elements constructed and arranged to detachably retain tools used in gardening and lawn care.

22. A wagon assembly according to claim 13 wherein said panel member includes guiding elements extending outwardly from opposite sides thereof; and said opening includes guiding portions disposed on opposite sides thereof, said guiding elements and said guiding portions being constructed and arranged such that said panel member can be removed from said opening to permit items used in gardening and lawn care carried in said main compartment to be removed therefrom through said opening.

23. A wagon assembly according to claim 22 further comprising:

one or more pin elements disposed on a bottom surface of said panel member; and one or more positioning holes corresponding to said pin elements formed on a bottom surface of said opening;

said pin elements being constructed and arranged to engage said positioning holes when said panel member is retained in said opening.

24. A wagon assembly according to claim 22 wherein said wagon body structure comprises tool clip elements constructed and arranged to detachably retain tools used in gardening and lawn care.

25. A wagon assembly according to claim 13 wherein said wagon body structure comprises tool clip elements constructed and arranged to detachably retain tools used in gardening and lawn care.

26. A wagon assembly according to claim 13 wherein said one or more storage compartments includes a secondary storage compartment constructed and arranged to accommodate the carriage of items and materials used in gardening and lawn care; and a lid member pivotally connected to said secondary storage compartment and movable between an opened position wherein said secondary storage compartment is open, thereby allowing access to said secondary storage compartment, and a closed position wherein said secondary storage compartment is closed.

27. A wagon assembly according to claim 13 further comprising:

a secondary handle structure mounted on said wagon body structure opposite said opening, said secondary handle structure being constructed and arranged such that the items used in gardening and lawn care carried in said main compartment can be removed therefrom when said panel member is moved from said opening by manually grasping said secondary handle structure and lifting said wagon assembly so as to dump the items used in gardening and lawn care carried in said main compartment outwardly through said opening.

28. A wagon assembly according to claim 13 wherein said seating surface is constructed and arranged to support items used in gardening and lawn care when said handle structure is in the seating position thereof, thereby facilitating gardening and lawn care activities by allowing a user of said wagon assembly to arrange certain items and materials used in gardening and lawn care on said seating surface.

29. A wagon assembly according to claim 13 further comprising:
   upwardly facing supporting surfaces constructed and arranged to support a similar wagon assembly stacked on top of said wagon assembly in a stable stacking relationship; and
   downwardly facing stacking surfaces constructed and arranged to engage upwardly facing supporting surfaces of a similar wagon assembly on top of which said wagon assembly is stacked in a stable stacking relationship.

30. A wagon assembly according to claim 29 wherein said wagon body structure comprises tool clip elements constructed and arranged to detachably retain tools used in gardening and lawn care.

31. A wagon assembly according to claim 29 wherein said one or more storage compartments includes a secondary storage compartment constructed and arranged to accommodate the carriage of items and materials used in gardening and lawn care; and
   a lid member pivotally connected to said secondary storage compartment and movable between an opened position wherein said secondary storage compartment is open, thereby allowing access to said secondary storage compartment, and a closed position wherein said secondary storage compartment is closed.

32. A wagon assembly according to claim 29 wherein said panel member includes guiding elements extending outwardly from opposite sides thereof; and
   said opening includes guiding portions disposed on opposite sides thereof, said guiding elements and said guiding portions being constructed and arranged such that said panel member can be removed from said opening to permit items used in gardening and lawn care carried in said main compartment to be removed therefrom through said opening.

33. A wagon assembly according to claim 32 further comprising:
   one or more pin elements disposed on a bottom surface of said panel member; and
   one or more positioning holes corresponding to said pin elements formed on a bottom surface of said opening;
   said pin elements being constructed and arranged to engage said positioning holes when said panel member is retained in said opening.

34. A wagon assembly according to claim 32 wherein said wagon body structure comprises tool clip elements constructed and arranged to detachably retain tools used in gardening and lawn care.

35. A wagon assembly according to claim 29 further comprising:
   a secondary handle structure mounted on said wagon body structure opposite said opening, said secondary handle structure being constructed and arranged such that the items used in gardening and lawn care carried in said main compartment can be removed therefrom when said panel member is moved from said opening by manually grasping said secondary handle structure and lifting said wagon assembly so as to dump the items used in gardening and lawn care carried in said main compartment outwardly through said opening.

36. A wagon assembly according to claim 14 wherein said seating surface is constructed and arranged to support items used in gardening and lawn care when said handle structure is in the seating position thereof, thereby facilitating gardening and lawn care activities by allowing a user of said wagon assembly to arrange certain items and materials used in gardening and lawn care on said seating surface.

37. A wagon assembly according to claim 14 further comprising:
   upwardly facing supporting surfaces constructed and arranged to support a similar wagon assembly stacked on top of said wagon assembly in a stable stacking relationship; and
   downwardly facing stacking surfaces constructed and arranged to engage upwardly facing supporting surfaces of a similar wagon assembly on top of which said wagon assembly is stacked in a stable stacking relationship.

38. A wagon assembly according to claim 1 wherein said wagon body structure comprises an opening constructed and arranged to permit items and materials used in gardening and lawn care carried in said main compartment to be removed therefrom through said opening; and
   a panel member constructed and arranged such that said panel member can be retained in said opening in an engaged relation, thereby preventing the items and materials carried in said main compartment from passing through said opening, and said panel member can be moved from said opening to permit items used in gardening and lawn care carried in said main compartment to be removed therefrom through said opening.

39. A wagon assembly according to claim 38 wherein said panel member includes guiding elements extending outwardly from opposite sides thereof; and
   said opening includes guiding portions disposed on opposite sides thereof, said guiding elements and said guiding portions being constructed and arranged such that said panel member can be removed from said opening to permit items used in gardening and lawn care carried in said main compartment to be removed therefrom through said opening.

40. A wagon assembly according to claim 39 further comprising:
   one or more pin elements disposed on a bottom surface of said panel member; and
   one or more positioning holes corresponding to said pin elements formed on a bottom surface of said opening;
   said pin elements being constructed and arranged to engage said positioning holes when said panel member is retained in said opening.

41. A wagon assembly according to claim 39 wherein said wagon body structure comprises tool clip elements constructed and arranged to detachably retain tools used in gardening and lawn care.

42. A wagon assembly according to claim 38 wherein said panel member is rectangular.

43. A wagon assembly according to claim 38 wherein said opening is formed in a rear end of said wagon body structure.

44. A wagon assembly according to claim 38 further comprising:
   a secondary handle structure mounted on said wagon body structure opposite said opening, said secondary handle structure being constructed and arranged such that the items used in gardening and lawn care carried in said main compartment can be removed therefrom when said panel member is moved from said opening by manually grasping said secondary handle structure and lifting said wagon assembly so as to dump the items used in gardening and lawn care carried in said main compartment outwardly through said opening.

45. A wagon assembly according to claim 38 wherein said seating surface is constructed and arranged to support items used in gardening and lawn care when said handle structure is in the seating position thereof, thereby facilitating gardening and lawn care activities by allowing a user of said wagon assembly to arrange certain items and materials used in gardening and lawn care on said seating surface.

46. A wagon assembly according to claim 38 further comprising:
   upwardly facing supporting surfaces constructed and arranged to support a similar wagon assembly stacked on top of said wagon assembly in a stable stacking relationship; and
   downwardly facing stacking surfaces constructed and arranged to engage upwardly facing supporting surfaces of a similar wagon assembly on top of which said wagon assembly is stacked in a stable stacking relationship.

47. A wagon assembly according to claim 46 wherein said opening is formed in a rear end of said wagon body structure.

48. A wagon assembly according to claim 46 wherein said panel member is rectangular.

49. A wagon assembly according to claim 46 wherein said panel member includes guiding elements extending outwardly from opposite sides thereof; and
   said opening includes guiding portions disposed on opposite sides thereof, said guiding elements and said guiding portions being constructed and arranged such that said panel member can be removed from said opening to permit items used in gardening and lawn care carried in said main compartment to be removed therefrom through said opening.

50. A wagon assembly according to claim 46 further comprising:
   a secondary handle structure mounted on said wagon body structure opposite said opening, said secondary handle structure being constructed and arranged such that the items used in gardening and lawn care carried in said main compartment can be removed therefrom when said panel member is moved from said opening by manually grasping said secondary handle structure and lifting said wagon assembly so as to dump the items used in gardening and lawn care carried in said main compartment outwardly through said opening.

51. A wagon assembly according to claim 49 further comprising:
   one or more pin elements disposed on a bottom surface of said panel member; and
   one or more positioning holes corresponding to said pin elements formed on a bottom surface of said opening;
   said pin elements being constructed and arranged to engage said positioning holes when said panel member is retained in said opening.

52. A wagon assembly according to claim 49 wherein said wagon body structure comprises tool clip elements constructed and arranged to detachably retain tools used in gardening and lawn care.

53. A wagon assembly according to claim 1 further comprising a stopping element constructed and arranged to yieldingly support said handle structure such that (1) said stopping element maintains said handle structure at a stopped position extending forwardly with respect to said wagon body structure and spaced in relation to a ground surface on which said wagon assembly is disposed, thereby facilitating grasping of said handle structure by allowing a user of said wagon assembly to grasp said handle structure without reaching down to the ground surface, and (2) said handle structure can be pivoted downwardly past said stopped position by exerting force in a downward direction on said handle structure sufficient to cause said stopping element to yield and allow said handle structure to move downward.

54. A wagon assembly according to claim 53 wherein said seating surface is constructed and arranged to support items used in gardening and lawn care when said handle structure is in the seating position thereof, thereby facilitating gardening and lawn care activities by allowing a user of said wagon assembly to arrange certain items and materials used in gardening and lawn care on said seating surface.

55. A wagon assembly according to claim 53 further comprising:
   upwardly facing supporting surfaces constructed and arranged to support a similar wagon assembly stacked on top of said wagon assembly in a stable stacking relationship; and
   downwardly facing stacking surfaces constructed and arranged to engage upwardly facing supporting surfaces of a similar wagon assembly on top of which said wagon assembly is stacked in a stable stacking relationship.

\* \* \* \* \*